United States Patent
Pelt

(10) Patent No.: US 7,109,808 B1
(45) Date of Patent: Sep. 19, 2006

(54) POLYPHASE NUMERICALLY CONTROLLED OSCILLATOR AND METHOD FOR OPERATING THE SAME

(75) Inventor: Robert Pelt, San Jose, CA (US)

(73) Assignee: Altera Corporation, San Jose, CA (US)

( * ) Notice: Subject to any disclaimer, the term of this patent is extended or adjusted under 35 U.S.C. 154(b) by 86 days.

(21) Appl. No.: 11/007,613

(22) Filed: Dec. 7, 2004

Related U.S. Application Data

(60) Provisional application No. 60/608,033, filed on Sep. 7, 2004.

(51) Int. Cl.
*H03B 1/04* (2006.01)

(52) U.S. Cl. .............................. 331/45; 331/46; 331/49; 331/74; 331/2; 327/105; 327/106; 327/107

(58) Field of Classification Search .................. 331/74, 331/45, 46, 49, 2; 327/105, 106, 107
See application file for complete search history.

(56) References Cited

U.S. PATENT DOCUMENTS 6,411,093 B1 * 6/2002 Schwilch et al. ........... 324/322

* cited by examiner

*Primary Examiner*—Arnold Kinkead
(74) *Attorney, Agent, or Firm*—Martine Penilla & Gencarella, LLP

(57) ABSTRACT

A polyphase numerically controlled oscillator (PNCO) is defined to include a plurality of sub-numerically controller oscillators (SNCO's). Each SNCO is capable of receiving a clock signal at a first clock rate and an assigned phase offset signal. Each SNCO is configured to generate a digital waveform for the assigned phase offset signal. The PNCO also includes a plurality of frequency multipliers for generating a frequency multiplied representation of the digital waveform generated by each SNCO. The PNCO further includes a multiplexer configured to receive output from each of the frequency multipliers according to the first clock rate. The multiplexer is further configured to receive a select signal, wherein the select signal triggers the multiplexer at a second clock rate.

24 Claims, 8 Drawing Sheets

POLYPHASE NUMERICALLY CONTROLLED OSCILLATOR AND METHOD FOR OPERATING THE SAME

CROSS REFERENCE TO RELATED APPLICATIONS

This application claims priority from U.S. Provisional Patent Application No. 60/608,033, filed Sep. 7, 2004, and entitled "Polyphase Numerically Controlled Oscillator and Method for Operating the Same." This provisional application is herein incorporated by reference.

BACKGROUND OF THE INVENTION

1. Field of the Invention

The present invention relates to digital circuitry. More specifically, the present invention relates to frequency translation in a digital domain.

2. Description of the Related Art

Traditionally, frequency translation such as frequency multiplication is performed by analog components. Analog components such as voltage controlled oscillators (VCOs) and mixers are used to approximate mathematical expressions of the multiplication process. Careful design practices must be employed to insure proper operation of the analog components in the presence of various power, voltage, and temperature conditions. In addition to normal difficulties commonly encountered in analog design, approximations inherent in the analog frequency multiplication circuitry can adversely affect a generated signal. To avoid the difficulties associated with analog circuitry, it is desirable to perform frequency translation such as frequency multiplication in a digital domain.

SUMMARY OF THE INVENTION

In one embodiment, a polyphase numerically controlled oscillator (PNCO) is disclosed. The PNCO includes a plurality of sub-numerically controller oscillators (SNCO's). Each SNCO is capable of receiving a phase increment signal at a first clock rate. Each SNCO is also capable of receiving an assigned phase offset signal. Additionally, each SNCO is configured to generate a digital waveform for the assigned phase offset signal. The digital waveform generated by each SNCO is multiplied by a phase shifted data signal and transmitted to a respective one of a plurality of frequency multipliers included within the PNCO.

Each of the frequency multipliers is configured to operate at the same clock rate as the SNCOs. Also, each of the frequency multipliers is configured to generate a frequency multiplied representation of the digital waveform received from a respective SNCO. The frequency multiplied representations of the digital waveforms as generated by the frequency multipliers are identical except for the phase shift inherent in the digital waveforms prior to the frequency multiplication.

The PNCO further includes a multiplexer (MUX) configured to receive each of the frequency multiplied representations of the digital waveforms as generated by the plurality of frequency multipliers. The MUX includes a plurality of input channels for receiving the frequency multiplied representations of the digital waveforms. Each input channel is defined to receive one of the frequency multiplied representations of the digital waveforms such that digital waveforms having sequential phase offsets are received by sequential input channels. Also, each of the frequency multiplied representations of the digital waveforms are received at their respective input channel in a parallel and simultaneous manner according to the first clock rate.

The MUX is further configured to receive a select signal, wherein the select signal triggers the MUX to transmit values present at the input channels in accordance with a second clock rate. The second clock rate is equal to N times the first clock rate, wherein N corresponds to the number of MUX input channels. The select signal triggers the MUX to output a value present at an input channel. Upon receipt of successive select signals the MUX will output a value present at a successive input channel. Thus, values present at the input channels of the MUX are output in a successive rotational manner according to the second clock rate. Since the second clock rate is an N-multiple of the first clock rate, each input channel of the MUX will receive fresh data prior to transmission by the MUX. The output from the MUX represents a frequency multiplied digital waveform having a frequency that is N-times a frequency of the digital waveform generated by each SNCO.

In another embodiment, a method for multiplying a frequency of a waveform is disclosed. The method includes an operation for generating a number of digital waveforms. Each of the number of digital waveforms is defined by a sequence of digital signals generated in accordance with a first clock rate. Each of the digital waveforms is equivalent except for a phase offset. The method also includes an operation for processing each of the number of digital waveforms to generate a corresponding frequency multiplied digital waveform. Each of the frequency multiplied digital waveforms is defined by a sequence of digital signals generated in accordance with the first clock rate. Each of the frequency multiplied digital waveforms is equivalent except for the phase offset present in the digital waveforms prior to the frequency multiplication.

The method further includes an operation for rotationally selecting digital signals from different ones of the frequency multiplied digital waveforms in accordance with a second clock. The second clock rate is an integer multiple of the first clock rate, wherein the integer multiple is equal to the number of digital waveforms. An ordering of the frequency multiplied digital waveforms in the rotational selection is based on an ordering of the phase offset of the frequency multiplied digital waveforms.

Other aspects and advantages of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
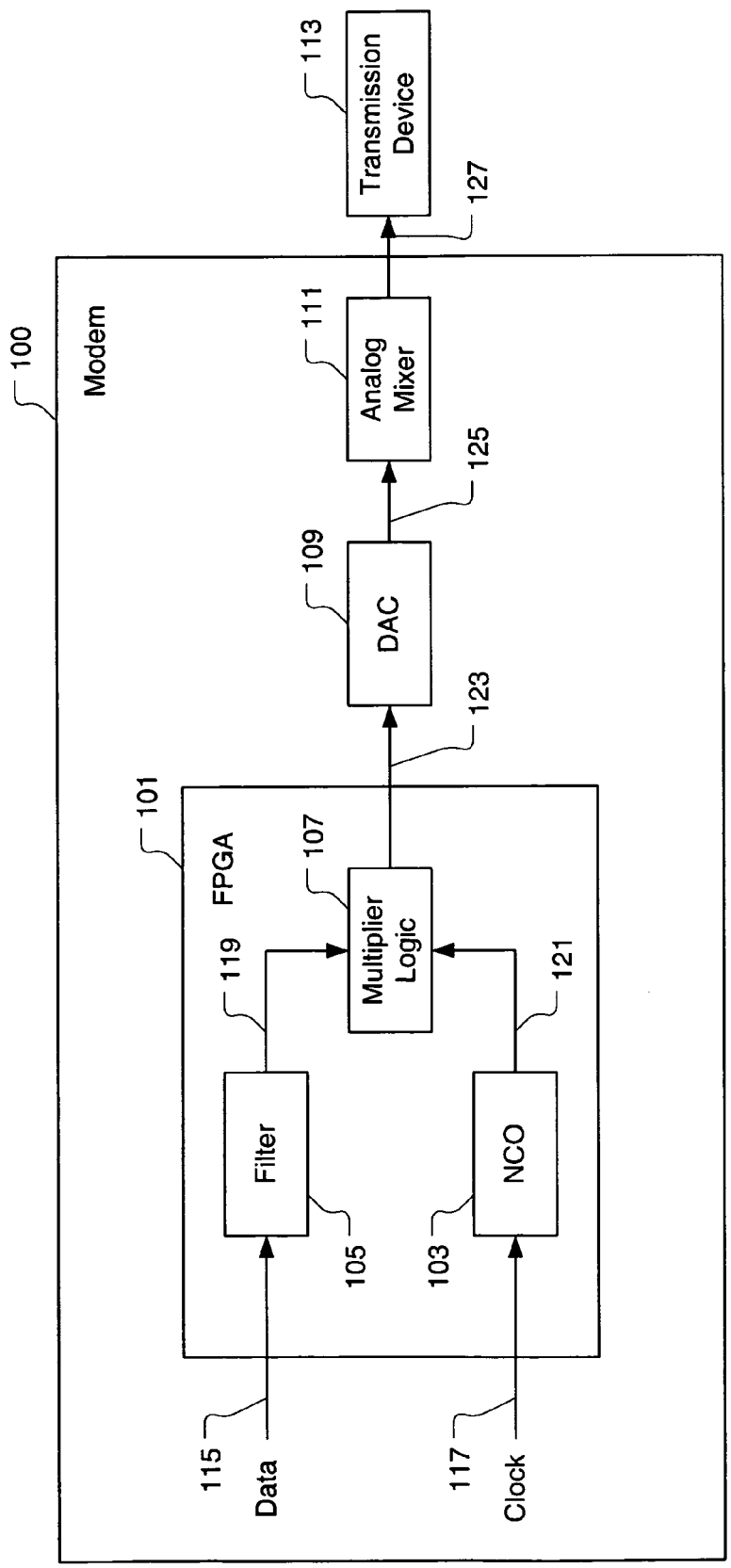
FIG. 1 is an illustration showing a portion of an exemplary digital communication architecture.

FIG. 1 is an illustration showing a portion of an exemplary digital communication architecture. The architecture includes a modem 100 configured to communicate analog signals to a transmission device 113, as indicated by arrow 127. The transmission device 113 can be wireless, e.g., an antennae, or wireline, e.g., a coaxial cable. It should be understood that the present invention is not limited in any way by the transmission device 113 used to propagate signals transmitted from the modem 100.

The modem 100 is defined to include a field programmable gate array (FPGA) 101, a digital-to-analog converter (DAC) 109, and an analog mixer 111. The DAC 109 is defined to receive digital signals, as indicated by arrow 123, and convert the received digital signals to corresponding analog signals to be output, as indicated by arrow 125. It will be appreciated by those skilled in the art that the analog mixer 111 receives the analog signals from the DAC 109, as indicated by arrow 125, and prepares the analog signals for transmission via the transmission device, as indicated by arrow 127.

The FPGA 101 is configured, at least in-part, to generate the digital signals transmitted to the DAC 109, as indicated by arrow 123. The FPGA 101 includes a data input and a clock input, as indicated by arrows 115 and 117, respectively. The FPGA 101 further includes a filter 105, a numerically controlled oscillator (NCO) 103, and multiplier logic 107. The filter 105 is configured to receive data signals from the data input 115. The filter 105 is further configured to refresh the data signals and transmit the refreshed data signals to the multiplier logic 107, as indicated by arrow 119. The NCO 103 is configured to receive the clock signals from the clock input 117. The NCO 103 is further configured to generate a digital representation of a sinusoidal waveform, i.e., digital waveform, in accordance with the received clock signals and transmit the digital waveform to the multiplier logic 107, as indicated by arrow 121. The multiplier logic 107 is defined to combine the data signals received from the filter 105 with the digital waveform received from the NCO 103 to generate a communication waveform. The multiplier logic is further configured to transmit the communication waveform to the DAC 109, as indicated by arrow 123, to be further processed. Since the digital waveform generated by the NCO 103 serves as a carrier wave for the data signals, it should be appreciated that the NCO 103 is a critical path component in establishing a rate at which the data signals can be transmitted from the exemplary digital communication architecture.

Figure 2:
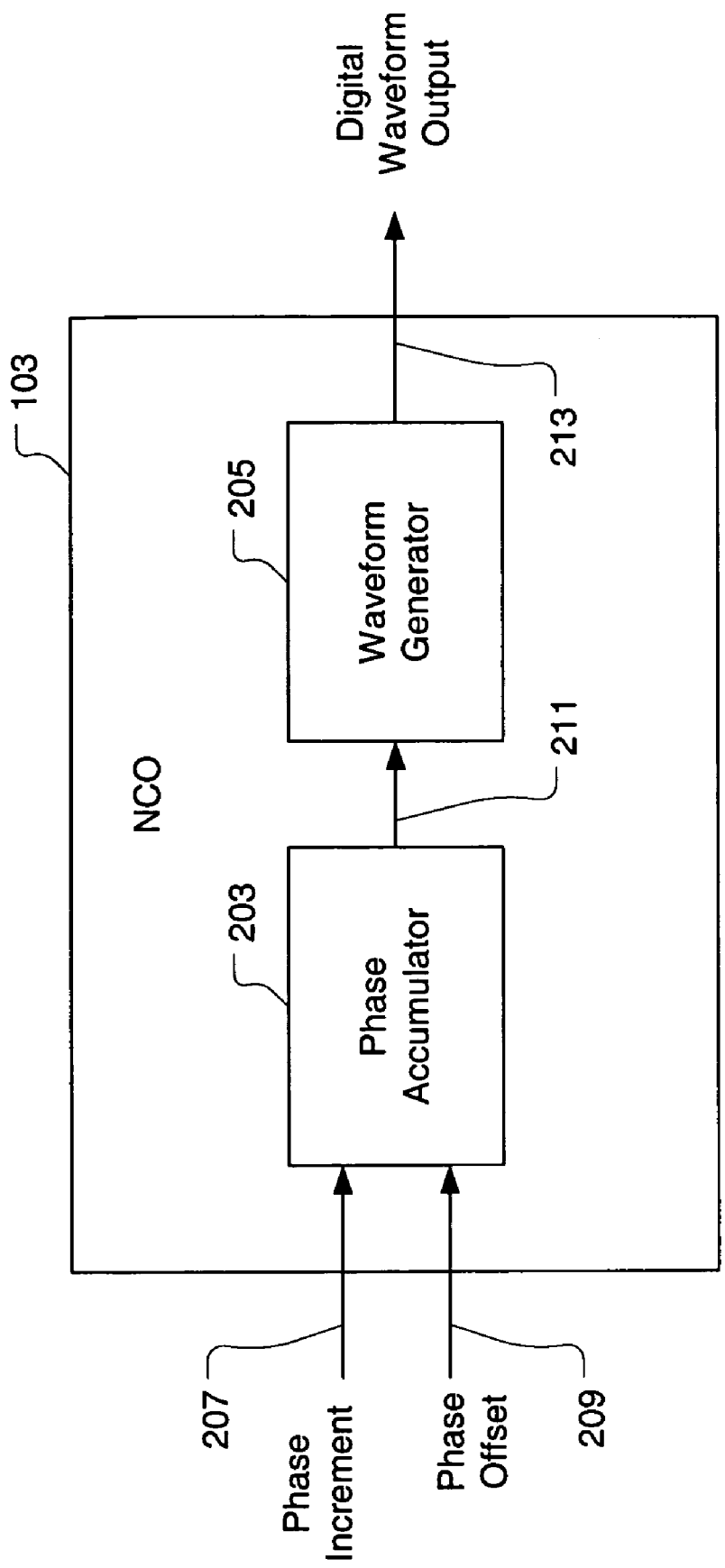
FIG. 2 is an illustration showing an architectural view of the NCO.

FIG. 2 is an illustration showing an architectural view of the NCO 103. The NCO 103 includes a phase accumulator 203 and a waveform generator 205. The phase accumulator 203 receives a phase increment input and a phase offset input, as indicated by arrows 207 and 209, respectively. Based on the phase increment input and the phase offset input, the phase accumulator 203 is configured to send a signal to the waveform generator, as indicated by arrow 211. In response to the signal received from the phase accumulator 203, the waveform generator 205 generates a signal defining a portion of the digital waveform output. The signal generated by the waveform generator 205 is transmitted as an output signal from the NCO 103, as indicated by arrow 213.

The waveform generator 205 of the NCO 103 effectively defines a tables of values specifying discrete temporal points of a normalized sinusoidal waveform. It should be appreciated that these discrete temporal points represent a normalized sinusoidal waveform when read in a sequential closed-loop manner. Therefore, outputting values corresponding to the discrete temporal points from the table of values in the sequential closed-loop manner serves to generate a corresponding digital waveform. Upon receiving an input signal from the phase accumulator, as indicated by arrow 211, the waveform generator 205 functions to output a signal representing a subsequent discrete temporal point from the table of values defined by the waveform generator 205. For discussion purposes, the appropriate discrete temporal point to be output by the waveform generator 205 can be tracked by a counter value that traverses through the table of values in a sequential closed-loop manner. The counter value is incremented upon receipt of the signal from the phase accumulator 203. Thus, the phase accumulator serves to control the digital waveform output from the NCO 103.

Upon receipt of the phase increment input signal, the phase accumulator 203 functions to send a counter value increment signal to the waveform generator 205. Therefore, the discrete temporal points included within the table of values of the waveform generator 205 are output in accordance with the phase increment input to the phase accumulator. The phase increment input can be defined as a clock signal or derived from a clock signal. If the phase increment input is defined as a clock signal, the discrete temporal points of the digital waveform output will be transmitted from the NCO 103 at a frequency derived from a frequency of the clock signal. Therefore, a frequency of the digital waveform output from the NCO 103 is derived from a frequency of the phase increment input to the NCO 103. Additionally, the phase offset input essentially serves to establish a starting location of the counter value within the table of values defined by the waveform generator 205. Therefore, the phase offset input can be set to cause a phase shift in the digital waveform output of the NCO 103. Though the NCO 103 has been described above in functional terms, it should be appreciated by those skilled in the art that the NCO 103 can be fully implemented as circuitry using any suitable electronics manufacturing process.

It should be further appreciated by those skilled in the art that the NCO 103 operates within boundaries defined by the Nyquist criteria. For example, the Nyquist criteria states that to generate a sine wave of a given frequency, a clock governing the sine wave generation needs to be at least twice the frequency of the sine wave to be generated. Therefore, to generate a sine wave having a frequency of 100 MHz, the clock governing the sine wave generation needs to have a frequency of at least 200 MHz. Hence, a maximum frequency of a sine wave that can be generated by the NCO 103 is limited to one-half of a frequency of the phase accumulator input signal to the NCO 103, i.e., one-half a frequency of the NCO 103 sampling rate. Consequently, the NCO 103 is limited by a speed of circuitry providing the phase accumulator input signal.

With respect to FIG. 1, the NCO 103 is implemented within the FPGA 101. Thus, the maximum sine wave frequency that can be generated by the NCO 103 is limited to one-half the operational frequency of the FPGA 101. Currently, FPGAs are limited to operational frequencies up to about 300 MHz. Therefore, current NCOs implemented within FPGAs are limited to generating digital representations of sinusoidal waveforms having a frequency up to about 150 MHz. It should be further appreciated that current DACs can operated as speeds of several GHz. Therefore, in the configuration of FIG. 1, a frequency of the analog waveform transmitted from the DAC is actually limited by the frequency of the digital waveform transmitted from the NCO 103, wherein the frequency of the digital waveform transmitted from the NCO 103 is limited to one-half the clock speed of the FPGA 101. Consequently, the NCO 103, as described above, is not capable of fully utilizing a frequency capacity i.e., achievable conversion rate, of the DAC 109. In view of the foregoing, an alternative to the NCO 103, as previously described, is needed to allow the FPGA 101 to match a conversion rate of the DAC 109.

Figure 3:
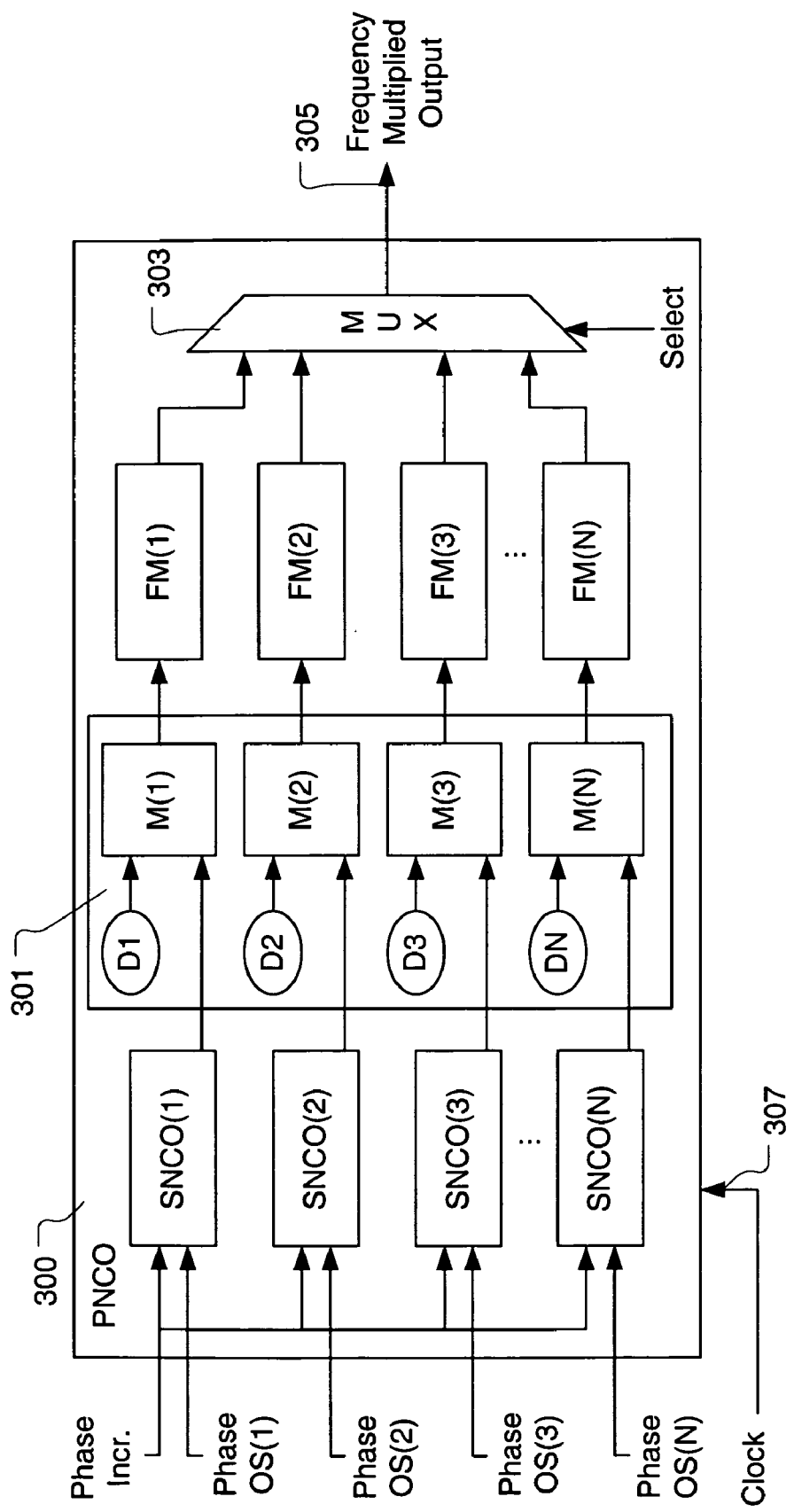
FIG. 3 is an illustration showing a polyphase numerically controlled oscillator (PNCO), in accordance with one embodiment of the present invention.

FIG. 3 is an illustration showing a polyphase numerically controlled oscillator (PNCO) 300, in accordance with one embodiment of the present invention. An architectural discussion of the PNCO 300 is provided below, followed by an operational discussion of the PNCO 300. The PNCO 300 includes a number of sub-numerically controlled oscillators (SNCOs), identified as SNCO(1) through SNCO(N). It should be understood that SNCO(N) represents an Nth SNCO where N can be any integer value. Thus, the PNCO 300 can include any number of SNCOs. Each SNCO is configured to receive a phase increment input, as indicated by "Phase Incr." arrows. Also, each of SNCO(1), SNCO(2), SNCO(3), and SNCO(N) is configured to receive a phase offset input, as indicated by Phase OS(1), Phase OS(2), Phase OS(3), and Phase OS(N), respectively. Each SNCO is defined both architecturally and functionally in the same manner as previously discussed with respect to NCO 103 of FIGS. 1 and 2. Therefore, each SNCO is configured to generate a digital representation of a sinusoidal waveform, i.e., a generated digital waveform, in accordance with the received phase increment input signal and phase offset input signal. It should be appreciated that the phase increment input is received simultaneously by each of SNCO(1) through SNCO(N) according to a first clock rate.

The generated digital waveforms are transmitted from each SNCO to a respective multiplier circuit within a polyphase multiplier 301. Thus, the digital waveform output from SNCO(1), SNCO(2), SNCO(3), and SNCO(N) is transmitted to multiplier circuits M(1), M(2), M(3), and M(N), respectively. Each of the multiplier circuits M(1), M(2), M(3), and M(N) is also configured to receive a data input, as indicated by D1, D2, D3, and DN, respectively. The data inputs D1 through DN represent a common data signal that has been shifted in phase according to the particular SNCO output with which it will be multiplied. The data signal and associated phase shifts is described in further detail below with respect to FIG. 7. Each of the multiplier circuits M(1), M(2), M(3), and M(N) serves to multiply its received data signal with the digital waveform received from the SNCO to which it is connected. It should be appreciated that the polyphase multiplier 301 can be integrated within the PNCO 300, as shown in FIG. 3, or implemented as independent circuitry connected to appropriately communicate with the PNCO 300.

The output of the multiplier circuits is transmitted to a respective frequency multiplier, identified as FM(1), FM(2), FM(3), and FM(N). Each of the frequency multipliers is configured to apply a mathematical conversion to the received digital waveform to generate a frequency multiplied representation of the received digital waveform. From each frequency multiplier, the respective frequency multiplied representation of the digital waveform received from the polyphase multiplier 301 is transmitted to a multiplexer (MUX) 303.

The MUX 303 is configured to have a separate input channel for each frequency multiplier (FM(1) through FM(N)). Accordingly, the MUX 303 receives the frequency multiplied representation of the digital waveform as output from each frequency multiplier at a respective input channel. The MUX 303 is further configured to output a data value present at each input channel in accordance with a select signal. The "Select" arrow represents receipt of the select signal by the MUX 303. Arrow 305 represents output generated by the MUX 303. The select signal is defined to be provided in accordance with a second clock rate. In one embodiment, the second clock rate is approximately equal to a clock rate of a DAC disposed downstream of the PNCO 300. As successive select signals are received by the MUX 303, the MUX 303 functions to transmit a data value from successive input channels. Thus, the data arriving at the input channels is transmitted from the MUX 303 in a closed-loop, successive manner in accordance with the second clock rate. The MUX 303 serves to generate a frequency multiplied output that is provided as an output of the PNCO 300.

Each serial combination of SNCO and frequency multiplier, via the polyphase multiplier, is defined as an "SNCO stage" within the PNCO 300. Since each SNCO and frequency multiplier is defined to operate in accordance with a common clock signal received at the first clock rate, data is simultaneously propagated through each SNCO stage to the respective input channel of the MUX 303 in accordance with the first clock rate. Because each SNCO is defined to function in an identical manner, the digital waveforms generated by each SNCO will be identical except for a phase offset as controlled by the respective phase offset input (Phase OS(1) through Phase OS(N)). Also, since each frequency multiplier is defined to function in an identical manner, the frequency multiplied representations of the digital waveforms as generated by each frequency multiplier will be identical except for a phase offset included within the digital waveforms input to each of the frequency multipliers.

The PNCO 300 as described architecturally above will now be further described in operational terms. For discussion purposes, the operational characteristics of the PNCO 300 will be described in terms of an exemplary PNCO having three SNCO stages. Thus, with reference to FIG. 3, the exemplary PNCO has an N value of 3 such that there is an SNCO(1) connected to an FM(1) via an M(1) to form SNCO stage (1), an SNCO(2) connected to an FM(2) via an M(2) to form SNCO stage (2), and an SNCO(3) connected to an FM(3) via an M(3) to form SNCO stage (3). It should be understood, however, that the present invention is not in any way limited by the number of SNCO stages used in the aforementioned exemplary PNCO. In practice, the PNCO 300 can be defined to have any number of SNCO stages.

Through the use of waveform phase shifting, waveform mathematical manipulation, and waveform multiplexing, the PNCO 300 is capable of exceeding its sample rate, i.e., capable of exceeding one-half the clock rate provided as the phase increment input. As previously discussed, the PNCO 300 uses multiple SNCOs to create multiple phase shifted versions of the same sinusoidal waveform. In the exemplary PNCO, three SNCOs are used to create three phase shifted versions of the same sinusoidal waveform. It should be appreciated that each of the SNCOs is defined to operate in an equivalent manner. Thus, the digital waveforms generated by each of the SNCOs are identical except for a shift in phase, i.e., shift in time. The shift in phase of each digital waveform is defined by the phase offset input to the respective SNCO. The phase offset input to a given SNCO can be calculated as follows:

$$\text{Phase Offset Input for } SNCO(n) = \left[ \frac{\left(\frac{2\pi}{\omega}\right)n}{N} \right],$$

wherein "n" represents the SNCO number in a sequence extending from 0 to N, and ω represents a number of digital waveform output signals to be generated by SNCO(n) in a given cycle of the digital waveform.

Figure 4:
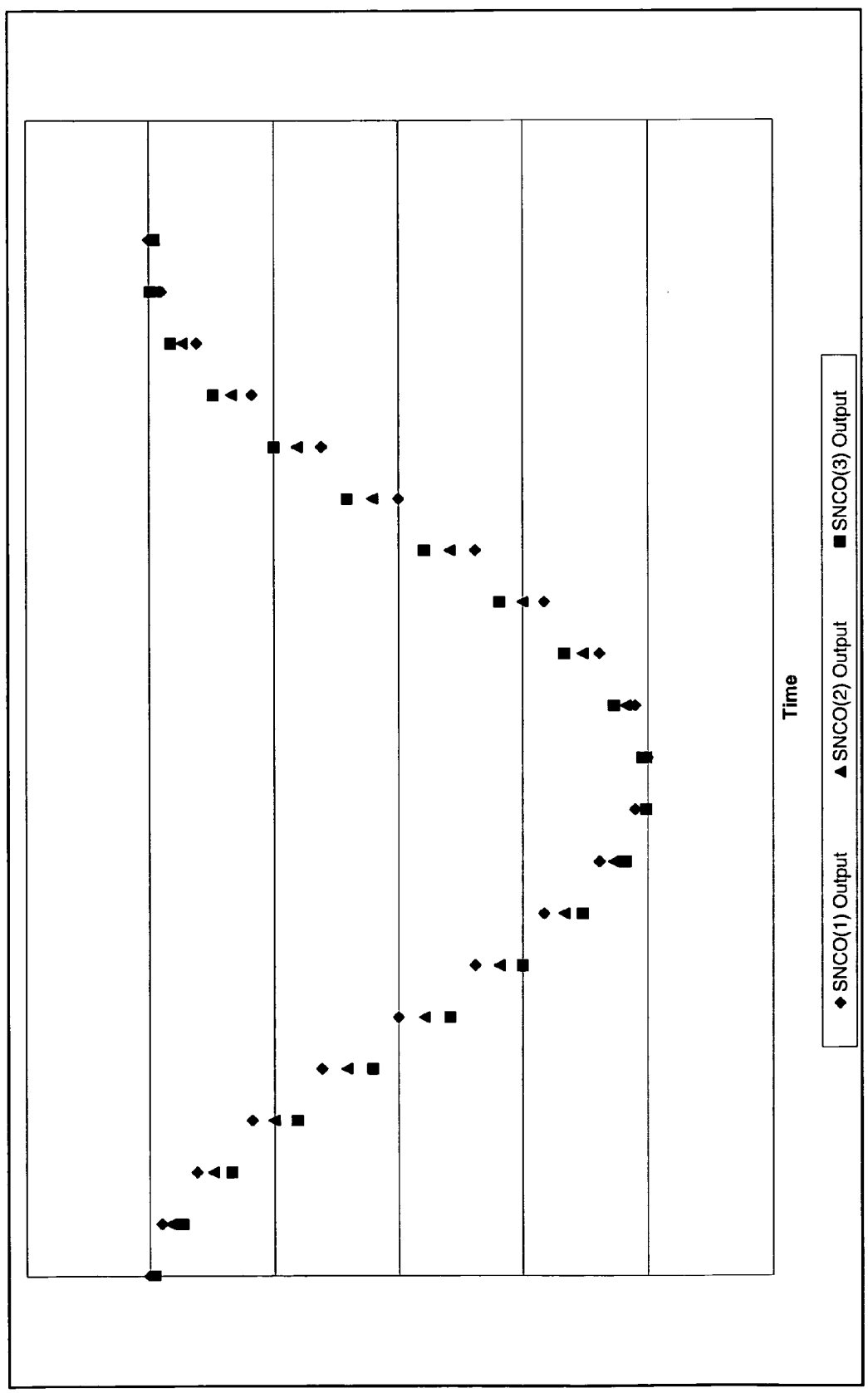
FIG. 4 is an illustration showing the digital waveforms generated by each of the three SNCOs of the exemplary PNCO, in accordance with one embodiment of the present invention.

FIG. 4 is an illustration showing the digital waveforms generated by each of the three SNCOs of the exemplary PNCO, in accordance with one embodiment of the present invention. The digital waveform output by SNCO(1) is depicted by the diamond-shaped tick marks. The digital waveform output by SNCO(2) is depicted by the triangle-shaped tick marks. The digital waveform output by SNCO (3) is depicted by the square-shaped tick marks. Since each of the SNCOs is configured to operate in accordance with the same phase increment input signal, each of the SNCOs functions to output their respective digital waveform output in a parallel and simultaneous manner. With reference to FIG. 3, the digital waveform output from SNCO(1), SNCO (2), and SNCO(3) are transmitted to M(1), M(2), and M(3) of the polyphase multiplier 301. The output of each of M(1), M(2), and M(3) represents a multiplication of the digital waveform output from the respective SNCO with an appropriately phase shifted data signal, wherein the phase shift of each data signal is coordinated with the phase offset input to the respective SNCO. The digital waveform output from each of M(1), M(2), and M(3) is transmitted to each of FM(1), FM(2), and FM(3), respectively.

Each of FM(1), FM(2), and FM(3) functions to generate an N-times frequency version of the particular digital waveform received from the respective SNCO. The N-times frequency version of the digital waveform as generated by the frequency multiplier is also referred to as a frequency multiplied representation of the digital waveform. It should be understood that N corresponds to the number of SNCO phases, i.e., the number of SNCO stages. Each frequency multiplier functions to generate the frequency multiplied representation of the received digital waveform by processing each digital waveform signal, as received from the respective SNCO, through circuitry defined to implement the following equation:

$$\cos(N^*a) = 2^*\cos((N-1)^*a)\cos(a) - \cos((N-2)^*a),$$

wherein cos(N*a) represents the frequency multiplied representation of the received digital waveform, "N" represents an integer frequency multiplier value to be applied to the received digital waveform (N continues to be defined by the number of SNCO phases), and "a" represents a value of the received digital waveform. Since, the frequency multiplier value N is equal to the number of SNCO phases, the number of SNCO stages in the PNCO is established based on a desired frequency multiplier value to be applied to the digital waveforms generated by the SNCOs.

It should be appreciated that the frequency of the sinusoidal waveform to be generated by the PNCO 300 is independent of the clock rate at which PNCO 300 operates. For example with respect to FIG. 3, the PNCO 300 (excluding the MUX 303) is configured to operate in accordance with a particular clock rate, as indicated by arrow 307. Therefore, the clock rate of at which the PNCO 300 operates determines a sampling rate for the sine wave to be generated by each SNCO. However, the frequency of the sine wave to be generated by each SNCO can be arbitrary. Furthermore, the frequency of the sine wave to be generated by the PNCO 300 is equal to N-times the sine wave frequency generated by each SNCO.

Figure 5:
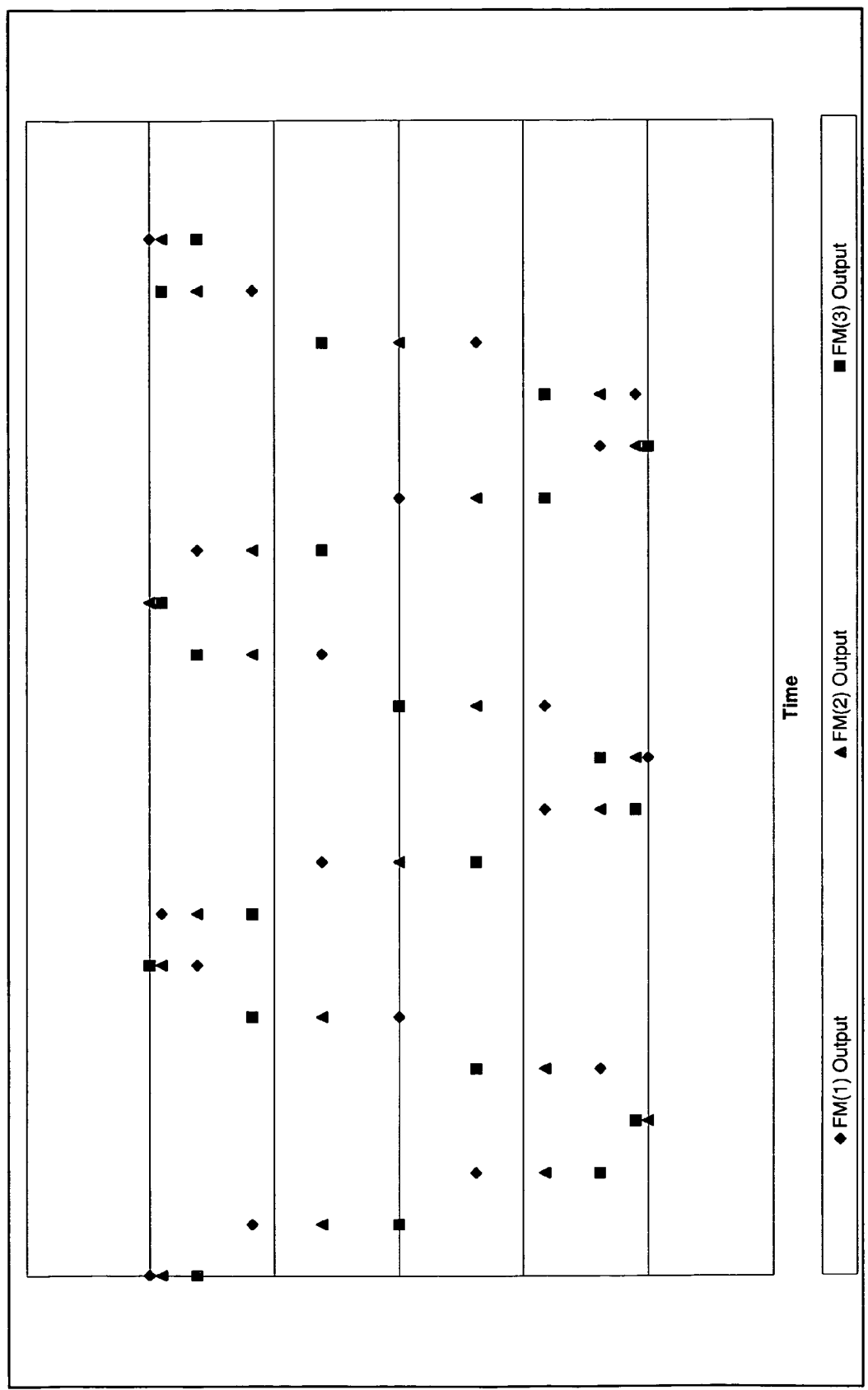
FIG. 5 is an illustration showing the frequency multiplied representations of the digital waveforms generated by each of the three frequency multipliers of the exemplary PNCO, in accordance with one embodiment of the present invention.

FIG. 5 is an illustration showing the frequency multiplied representations of the digital waveforms generated by each of the three frequency multipliers of the exemplary PNCO, in accordance with one embodiment of the present invention. The digital waveform output by FM(1) is depicted by the diamond-shaped tick marks. The digital waveform output by FM(2) is depicted by the triangle-shaped tick marks. The digital waveform output by FM(3) is depicted by the square-shaped tick marks. Since the exemplary PNCO includes three SNCO stages, each frequency multiplier functions to convert the incoming digital waveform into a digital waveform having a frequency three times that of the incoming digital waveform. It should be understood, however, that a rate at which each frequency multiplier provides output is dictated by the rate at which each frequency multiplier receives input. The rate at which each frequency multiplier receives input is determined by the rate at which each SNCO provides output, which is determined by the clock rate at which each SNCO is operating.

Signals defining the frequency multiplied digital waveforms as output by each frequency multiplier are transmitted in a parallel and simultaneous manner to the MUX 303. Therefore, the MUX 303 receives a data signal for each phase shifted, frequency multiplied digital waveform in a simultaneous manner according to the clock rate at which the SNCOs operate, i.e., the first clock signal having the first clock rate. Each phase shifted, frequency multiplied digital waveform is received at a different input channel of the MUX 303. Thus, in the exemplary PNCO having three SNCO stages, the MUX has three input channels to receive the respective digital waveforms.

The MUX 303 also receives a select signal in accordance with a second clock signal having a second clock rate, wherein the second clock rate is an N-times multiple of the first clock rate at which the SNCOs operate. Upon receiving the select signal, the MUX 303 is triggered to transmit a signal present at one of the input channels. Each successive select signal causes the MUX 303 to transmit a signal present at a different one of the input channels such that the signals present at the various input channels are transmitted in a successive rotational manner. It should be appreciated that the phase shifted, frequency multiplied digital waveforms are transmitted to sequential input channels of the MUX 303 according to a phase shift sequence.

Figure 6:
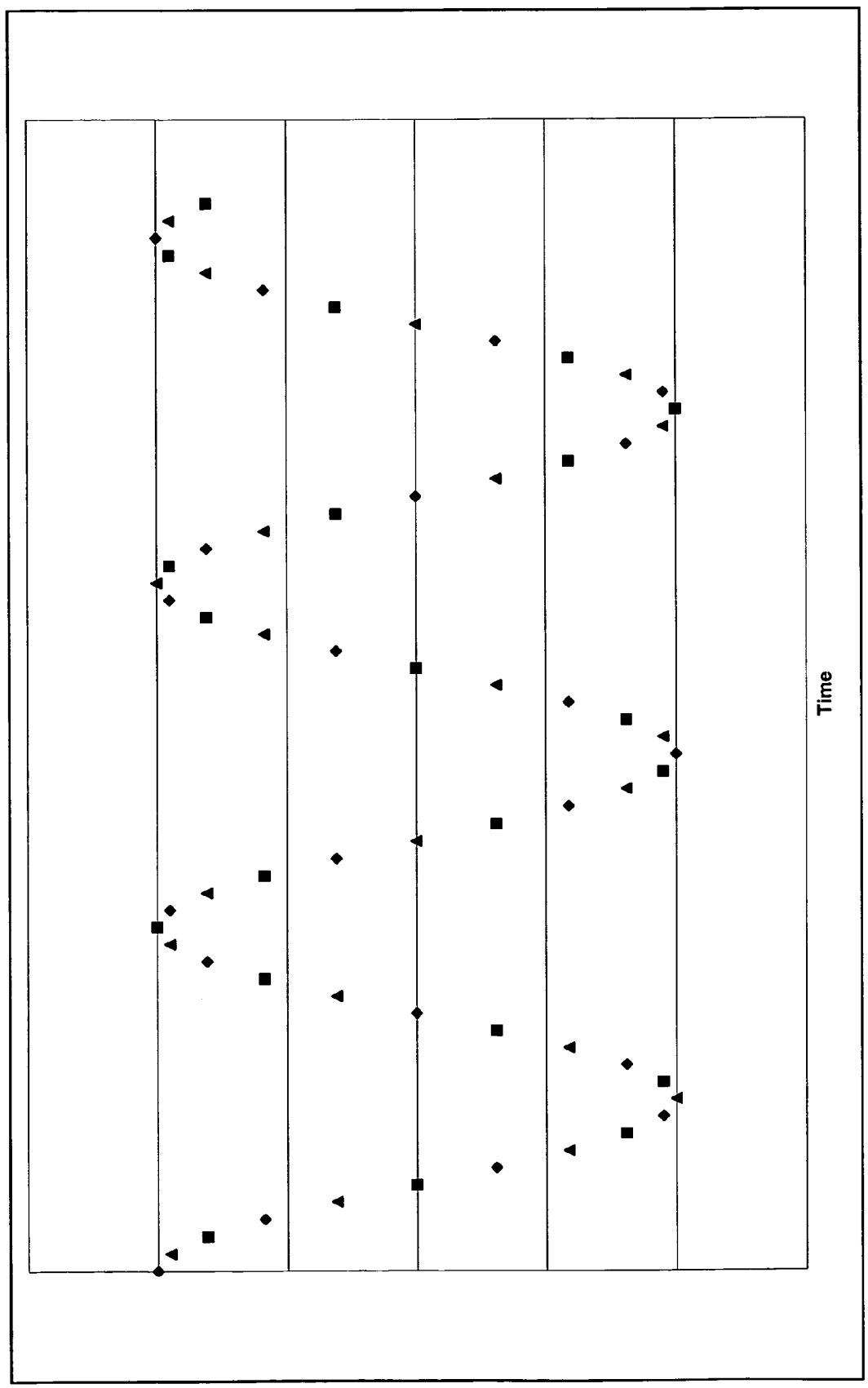
FIG. 6 is an illustration showing the output from the MUX of the exemplary PNCO, in accordance with one embodiment of the present invention.

FIG. 6 is an illustration showing the output from the MUX of the exemplary PNCO, in accordance with one embodiment of the present invention. The digital waveform output by FM(1) is depicted by the diamond-shaped tick marks. The digital waveform output by FM(2) is depicted by the triangle-shaped tick marks. The digital waveform output by FM(3) is depicted by the square-shaped tick marks. The MUX serves as a constructor of the final frequency multiplied digital waveform output of the PNCO. The digital waveform output from each FM is received by the MUX such that a particular input channel of the MUX that is up for transmission will hold the correct signal for the final frequency multiplied digital waveform output.

The MUX operation can be further described in terms of an analogy. Consider that the MUX is represented as a revolver, wherein each input channel of the MUX represents a chamber of the revolver. The number of input channels, i.e., the number of chambers, corresponds to the integer frequency multiplier to be implemented by the PNCO or the number of SNCO stages within the PNCO. Further consider that the various phase shifted, frequency multiplied digital waveforms as generated by the frequency multipliers define the bullets to be loaded into the chambers. Also, consider that each bullet loaded into the revolver defines a particular data point in the final frequency multiplied digital waveform to be output. Additionally, consider that all chambers of the revolver are simultaneously loaded with the correct bullets. The select signal to the MUX represents the trigger of the revolver. In operation, the trigger of the revolver, i.e., select signal to the MUX, is pulled at a constant rate corresponding to the second clock rate. As the trigger is continuously pulled at the constant rate, the chambers are reloaded in a simultaneous manner such that an appropriate bullet is always loaded for a corresponding pull of the trigger. Thus, the chambers are reloaded at a rate corresponding to at least the second clock rate divided by the number of chambers, i.e., the number of SNCO stages. Therefore, the final frequency multiplied digital waveform output from the MUX represents a true digital waveform having a sampling rate defined by the frequency of the second clock.

The PNCO as described above provides for generation of a digital waveform having a higher frequency than a clock feeding the PNCO. In contrast to conventional NCOs, it should be appreciated that the PNCO is not limited by the Nyquist criteria. The PNCO can be defined to allow matching of any FPGA clock frequency to any DAC frequency. Since DACs are fundamental building blocks of modems for wireless and wireline applications, the PNCO enables FPGAs to be retained as an integral part of modem systems despite a frequency differential between the FPGAs and the DACs.

Figure 7:
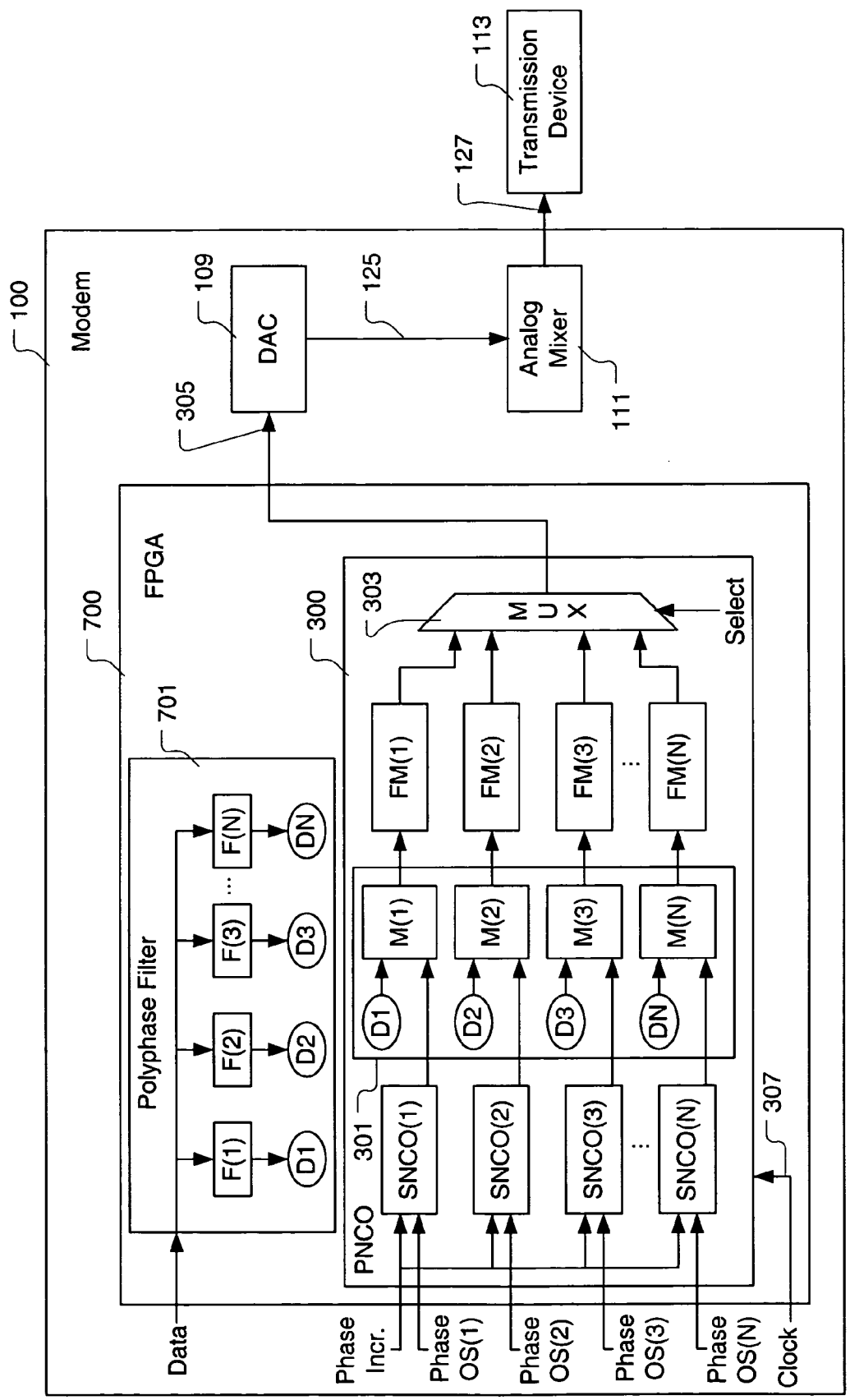
FIG. 7 is an illustration showing a portion of an exemplary digital communication architecture similar to that depicted in FIG. 1, wherein the FPGA has been replaced by a modified FPGA incorporating the PNCO of FIG. 3.

FIG. 7 is an illustration showing a portion of an exemplary digital communication architecture similar to that depicted in FIG. 1, wherein the FPGA 101 has been replaced by a modified FPGA 700 incorporating the PNCO 300 of FIG. 3. The PNCO 300 of FIG. 7 is the same as that previously described with respect to FIG. 3. The FPGA 700 includes a polyphase filter 701 defined to receive a data signal and generate a number of phase shifted versions of the received data signal. Thus, the polyphase filter 701 includes a number of sub-filters identified as F(1), F(2), F(3), and F(N). The output of each sub-filter represents a data signal input (D1, D2, D3, and DN) to be provided to a respective multiplier circuit with the polyphase multiplier 301. It should be appreciated that the data signal phase shift provided by each sub-filter is coordinated with the SNCO phase offset input of the SNCO stage within which the phase-shifted data signal is to be utilized.

Figure 8:
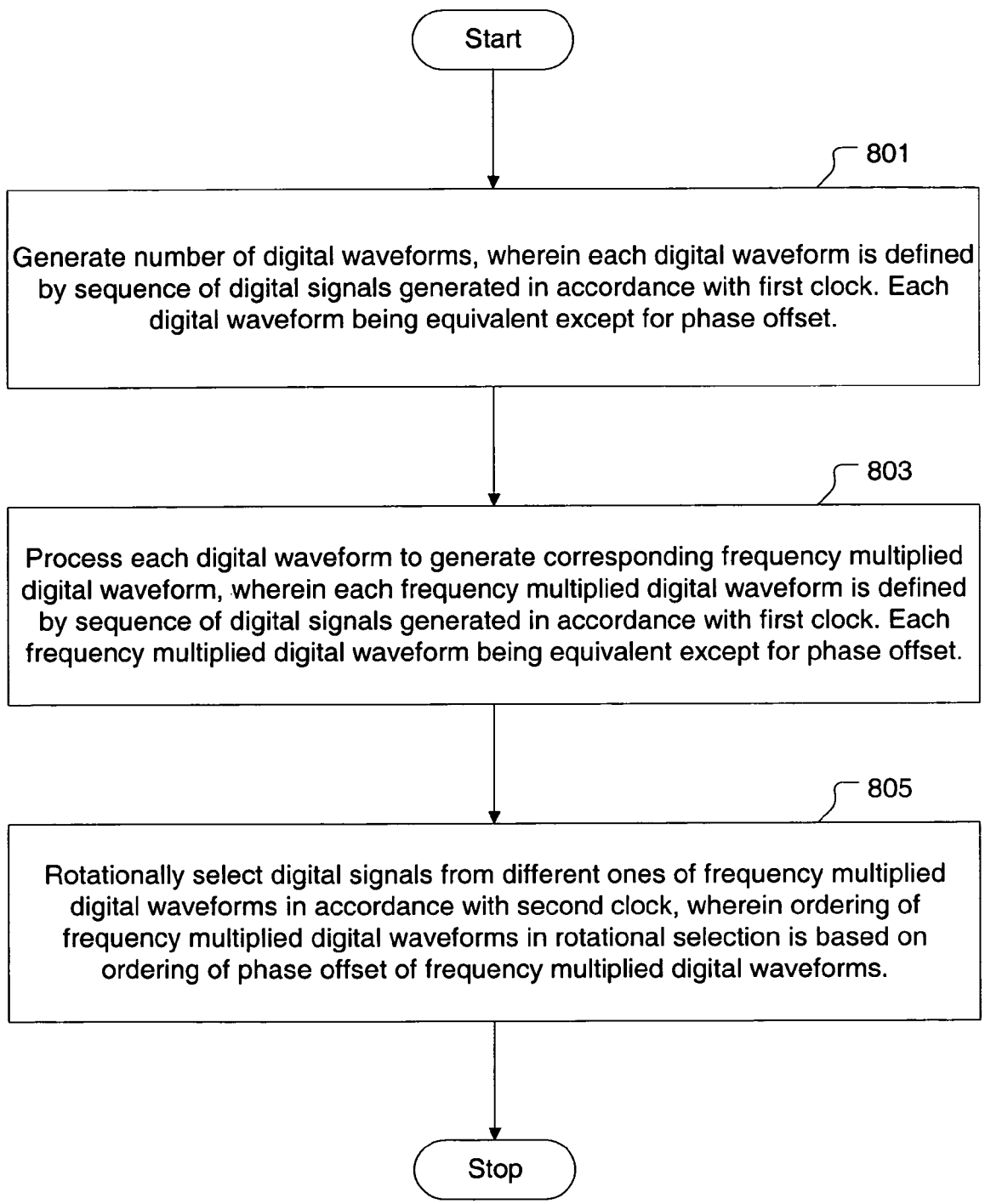
FIG. 8 is an illustration showing a flowchart of a method for multiplying a frequency of a waveform, in accordance with one embodiment of the present invention.

FIG. 8 is an illustration showing a flowchart of a method for multiplying a frequency of a waveform, in accordance with one embodiment of the present invention. The method includes a operation 801 for generating a number of digital waveforms. Each of the number of digital waveforms is defined by a sequence of digital signals generated in accordance with a first clock. The number of generated digital waveforms are equivalent except for a phase offset. In one embodiment, the number of digital waveforms are respectively generated by a corresponding number of numerically controlled oscillators.

The method also includes an operation 803 for processing each of the number of digital waveforms to generate a corresponding frequency multiplied digital waveform. Each of the frequency multiplied digital waveforms is defined by a sequence of digital signals generated in accordance with the first clock. Also, each of the frequency multiplied digital waveforms is equivalent except for the phase offset. The operation 803 is performed through application of the following equation:

$$\cos(N*a)=2*\cos((N-1)*a)\cos(a)-\cos((N-2)*a),$$

wherein $\cos(N*a)$ represents the corresponding frequency multiplied digital waveform, "N" represents an integer value, and "a" represents the digital waveforms to be frequency multiplied. In one embodiment, the corresponding frequency multiplied digital waveforms are generated by a respective frequency multiplier.

The method further includes an operation 805 for rotationally selecting digital signals from different ones of the frequency multiplied digital waveforms in accordance with a second clock. An ordering of the frequency multiplied digital waveforms in the rotational selection is based on a sequential ordering of the phase offset of the frequency multiplied digital waveforms. The rotationally selected digital signals serve to define a final digital waveform having a frequency corresponding to a frequency multiple of the second clock. It should be understood that the frequency of the second clock is equal to a frequency of the first clock multiplied by an integer value, wherein the integer value is equal to the number of digital waveforms generated in the operation 801. In one embodiment, rotational selection of operation 805 is performed by operating a multiplexer to rotationally select digital signals from different ones of the frequency multiplied digital waveforms in accordance with the second clock.

The polyphase numerically controlled oscillator described herein may be incorporated into a programmable logic device. The programmable logic device may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any other suitable application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A polyphase numerically controlled oscillator (PNCO), comprising:
   a plurality of sub-numerically controlled oscillators (SN-CO's), each SNCO capable of receiving a clock signal at a first clock rate and an assigned phase offset signal for each SNCO, and each SNCO being configured to generate a digital waveform for the assigned phase offset signal;
   a plurality of frequency multipliers for receiving the generated digital waveforms from each SNCO, each of the frequency multipliers being configured to generate a frequency multiplied representation of the received digital waveforms, each of the plurality of frequency multipliers configured to operate at the first clock rate; and
   a multiplexer configured to receive output from each of the frequency multipliers according to the first clock rate, the multiplexer further configured to receive a select signal triggering the multiplexer at a second clock rate.

2. A PNCO as recited in claim 1, wherein a number of the plurality of SNCO's corresponds to a number of times the second clock rate is faster than the first clock rate.

3. A PNCO as recited in claim 1, wherein a one-to-one correspondence exists between the plurality of SNCO's and the plurality of frequency multipliers.

4. A PNCO as recited in claim 1, wherein the second clock rate is an integer multiple of the first clock rate.

5. A PNCO as recited in claim 1, wherein a number of the plurality of SNCO's is equal to a value of the integer multiple.

6. A PNCO as recited in claim 1, wherein each SNCO is defined to generate an equivalent digital waveform except for a phase offset specified by the assigned phase offset signal.

7. A PNCO as recited in claim 1, wherein each SNCO includes a phase accumulator module and a waveform generation module.

8. A PNCO as recited in claim 1, wherein each of the plurality of frequency multipliers is configured to output data defining the frequency multiplied representation of the received digital waveforms at the first clock rate.

9. A PNCO as recited in claim 1, wherein the multiplexer is configured to rotationally output a different one of the received frequency multiplier outputs in accordance with the second clock rate as indicated by the select signal.

10. A PNCO as recited in claim 9, wherein a rotational output order of the received frequency multiplier outputs is based on an ordering of the phase offset of the received frequency multiplier outputs.

11. A PNCO as recited in claim 1, wherein each frequency multiplier is configured to generate the frequency multiplied representation of the received digital waveform through a circuitry implementation of an equation $$\cos(N*a)=2*\cos((N-1)*a)\cos(a)-\cos((N-2)*a),$$

wherein $\cos(N*a)$ represents the frequency multiplied representation of the received digital waveform, "N" represents an integer frequency multiplier value to be applied to the received digital waveform, and "a" represents values of the received digital waveform.

12. A field programmable gate array (FPGA), comprising:
   a first clock circuit configured to generate a first clock signal having a first clock rate;
   a second clock circuit configured to generate a second clock signal having a second clock rate, the second clock rate corresponding to the first clock rate multiplied by an integer value; and
   a polyphase numerically controlled oscillator (PNCO) configured to operate in accordance with the first clock signal and the second clock signal, the PNCO including,
      a number of sub-numerically controlled oscillators (SNCO's) equal to the integer value, each SNCO capable of receiving the first clock signal and an assigned phase offset signal for each SNCO, and each SNCO being configured to generate a digital waveform for the assigned phase offset signal,
      a number of frequency multipliers for receiving the generated digital waveforms from each SNCO, each of the frequency multipliers being configured to generate frequency multiplied representation of the received digital waveforms, each of the number of frequency multipliers configured to operate in accordance with the first clock signal, and
      a multiplexer configured to receive output from each of the frequency multipliers according to the first clock signal, the multiplexer further configured to receive a select signal triggering the multiplexer in accordance with the second clock signal.

13. A FPGA as recited in claim 12, wherein a one-to-one correspondence exists between the number of SNCO's and the number of frequency multipliers.

14. A FPGA as recited in claim 12, wherein each SNCO is defined to generate an equivalent digital waveform except for a phase offset specified by the assigned phase offset signal.

15. A FPGA as recited in claim 12, wherein each of the number of frequency multipliers is configured to output data defining the frequency multiplied representation of the received digital waveforms at the first clock rate.

16. A FPGA as recited in claim 12, wherein the multiplexer is configured to rotationally output a different one of the received frequency multiplier outputs in accordance with the second clock rate as indicated by the select signal.

17. A FPGA as recited in claim 12, wherein a rotational output order of the received frequency multiplier outputs is based on an ordering of the phase offset of the received frequency multiplier outputs.

18. A method for multiplying a frequency of a waveform, comprising:
   generating a number of digital waveforms, each of the number of digital waveforms being defined by a sequence of digital signals generated in accordance with a first clock, each of the digital waveforms being equivalent except for a phase offset;
   processing each of the number of digital waveforms to generate a corresponding frequency multiplied digital waveform, each of the frequency multiplied digital waveforms being defined by a sequence of digital signals generated in accordance with the first clock, each of the frequency multiplied digital waveforms being equivalent except for the phase offset; and rotationally selecting digital signals from different ones of the frequency multiplied digital waveforms in accordance with a second clock, wherein an ordering of the frequency multiplied digital waveforms in the rotationally selecting is based on an ordering of the phase offset of the frequency multiplied digital waveforms.

19. A method for multiplying a frequency of a waveform as recited in claim 18, wherein the frequency of the second clock is equal to a frequency of the first clock multiplied by an integer value.

20. A method for multiplying a frequency of a waveform as recited in claim 19, wherein the number of digital waveforms is equal to the integer value.

21. A method for multiplying a frequency of a waveform as recited in claim 19, wherein processing each of the number of digital waveforms to generate the corresponding frequency multiplied digital waveform is performed by applying an equation $$\cos(N*a)=2*\cos((N-1)*a)\cos(a)-\cos((N-2)*a),$$

wherein $\cos(N*a)$ represents the corresponding frequency multiplied digital waveform, "N" represents integer value, and "a" represents values of the number of digital waveforms.

22. A method for multiplying a frequency of a waveform as recited in claim 18, further comprising:

operating a number of numerically controlled oscillators to generate the number of digital waveforms.

23. A method for multiplying a frequency of a waveform as recited in claim 18, further comprising:

operating a separate frequency multiplier to process each of the number of digital waveforms to generate the corresponding frequency multiplied digital waveform.

24. A method for multiplying a frequency of a waveform as recited in claim 18, further comprising:

operating a multiplexer to rotationally select digital signals from different ones of the frequency multiplied digital waveforms in accordance with the second clock.

* * * * *